June 9, 1964 R. A. CARLSON 3,136,940
TRANSISTOR VOLTAGE REGULATOR FOR A GENERATOR WITH
MEANS FOR PREVENTING DISCHARGE OF BATTERY THROUGH
FIELD WINDING OR OUTPUT WINDING
Filed Sept. 12, 1960
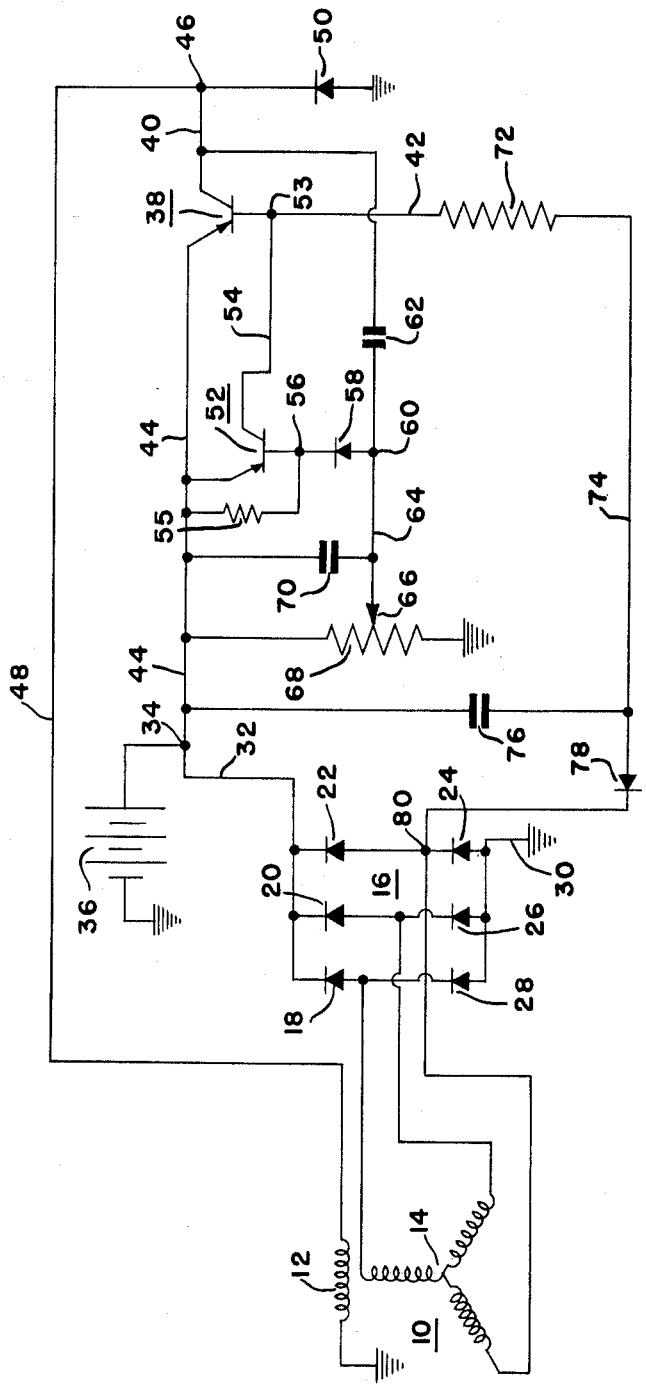
INVENTOR.
Richard A. Carlson
BY C. R. Meland
His Attorney

United States Patent Office 3,136,940
Patented June 9, 1964

3,136,940
TRANSISTOR VOLTAGE REGULATOR FOR A GENERATOR WITH MEANS FOR PREVENTING DISCHARGE OF BATTERY THROUGH FIELD WINDING OR OUTPUT WINDING
Richard A. Carlson, Clarkston, Mich., assignor to General Motors Corporation, Detroit, Mich., a corporation of Delaware
Filed Sept. 12, 1960, Ser. No. 55,588
15 Claims. (Cl. 322—73)

This invention relates to voltage regulating systems for generators and more particularly to regulating systems wherein a semiconductor such as a transistor controls the field current of the generator.

One of the problems encountered in the use of an electrical system that includes a direct current power source and a transistor regulator is the preventing of discharging of the battery of the system through the output and field windings of the generator. Discharging of the battery through the output winding may be prevented by the use of junction rectifiers in a manner illustrated in the patent to Short 2,809,301. The problem of preventing discharging of the battery through the field winding is complex since the battery in many systems biases the transistor that controls field current to its conductive condition and therefore permits battery discharge when the generator is shut down.

It accordingly is an object of this invention to provide a transistor regulating system for a direct current power source wherein means are provided discharging of the battery through either the field winding or the output winding of the power source.

A more specific object of this invention is to provide a transistor regulating system for a generator or the like wherein a transistor controls generator field current and wherein the transistor is non-conductive when the generator is not operating but is rendered conductive by pulses of energy coming from a circuit that includes an energy storing device such as a condenser and further wherein the circuit is energized by the generator.

Still another object of this invention is to provide an electrical system that includes an A.C. generator that is connected with a bridge rectifier network, the generator field current being controlled by one or more transistors connected with the output terminals of the bridge rectifier network and the transistor or transistors having biased voltages applied thereto which are taken across only one rectifier of the bridge rectifier network.

Further objects and advantages of the present invention will be apparent from the following description, reference being had to the accompanying drawing wherein a preferred embodiment of the present invention is clearly shown.

In the drawing the single figure drawing is a schematic circuit illustration of an electrical system made in accordance with this invention.

Referring now to the drawing, the reference numeral 10 generally designates a power source for the electrical system of this invention which in this case is an alternating current generator. The generator 10 has a field winding 12 and a three-phase Y-connected output winding generally designated by reference numeral 14. One of the windings is driven, for example, by the engine of a motor vehicle.

The phase windings which make up the output winding 14 of the generator are connected with a three-phase, full wave bridge rectifier network generally designated by reference numeral 16. This bridge rectifier network includes the rectifiers 18, 20, 22, 24, 26 and 28 all of which are preferably of the pn junction semi-conductor type. One side of the bridge rectifier network is connected directly to ground by the lead wire 30 whereas the opposite side of this bridge rectifier network is connected with the lead wire 32. The lead wire 32 is connected with a junction 34 and a storage battery 36 is connected between junction 34 and ground. It will be apparent that the battery 36 is connected directly across the output sides of the rectifier network 16 and therefore receives charging current from the rectifier network. It is also apparent that other direct current loads can be connected between junction 34 and ground to be supplied by the alternator-rectifier combination.

The system of this invention is provided with a transistor voltage regulating arrangement for maintaining the output voltage appearing across lead wires 30 and 32 substantially constant. This regulator includes a first three-terminal semi-conductor generally designated by reference numeral 38 which in this case is a transistor. The transistor 38 has a collector electrode connected with lead wire 40 and a base electrode connected with the lead wire 42. The emitter electrode of transistor 38 is connected with a lead wire 44. The lead wire 40 is connected with a junction 46 and it is seen that the field winding 12 is connected with the junction 46 via the lead wire 48. A rectifier 50 of the pn junction semi-conductor type is connected between junction 46 and ground.

The voltage regulator includes another semi-conductor 52 which is a transistor. It can be seen that the collector electrode of transistor 52 is connected with lead wire 42 via the lead wire 54. The emitter electrode of transistor 52 is connected with the lead wire 44 whereas the base electrode of transistor 52 is connected with a junction 56. A Zener diode designated by reference numeral 58 is connected between the junction 56 and the junction 60. The Zener diode, as is well known to those skilled in the art, is a constant voltage device which operates to prevent current flow through it in a reverse direction until the voltage applied to the diode is increased to a predetermined value. After the diode breaks down when the critical voltage is reached, the diode acts as a constant voltage device.

The junction 60 is connected with the lead wire 40 by a capacitor 62. The junction 60 is also connected with a lead wire 64 which is in turn connected with a shiftable tap 66 that cooperates with the resistor 68. A capacitor 70 is connected between the lead wire 64 and the lead wire 44. It is seen that one end of the resistor 68 is connected with the lead wire 44 whereas the opposite end of this resistor is connected directly to ground.

The lead wire 42 that is connected with the base electrode of transistor 38 is connected to one side of a resistor 72. The opposite side of resistor 72 is connected with lead wire 74 and it is seen that a capacitor 76 is connected directly across the lead wires 44 and 74. The lead wire 74 is connected to one side of a pn junction semi-conductor rectifier 78, the opposite side of this rectifier being connected with a junction 80 that is connected between rectifiers 22 and 24. It can be seen that the lead wire 44 is connected with the junction 34 so that one side of the bridge rectifier network is connected directly with the lead wire 44.

When the generator 10 is in a shut-down or at rest condition, the battery 34 is prevented from discharging through the output winding 14 and through the field winding 12. The battery cannot discharge through the output winding 14 due to the provision of the bridge rectifier network 16 which is comprised of junction rectifiers. The battery likewise cannot discharge through the field winding 12 since at this time the transistor 38 has no bias voltage applied thereto to cause it to be conductive. Thus, the emitter electrode of transistor 38 is directly connected to one side of the battery 34 but there is no connection between the base electrode of transistor 38 and ground so that the transistor 38 remains non-conductive between emitter and collector when the generator is shut down.

As the rotatable element of the generator 10 is now rotated as by starting the engine that drives the same, an output voltage will be developed in the output or stator winding 14 by the residual magnetism in the generator rotor and field system. It can be seen that when an output voltage is developed in the output winding 14 a pulsating direct current voltage will be developed across the rectifier 22 that will appear between lead wire 32 and the junction 80. When the polarity of the A.C. voltage appearing across the phase windings of the stator 14 is such that the diode 22 is in a blocking condition, the voltage across the lead wire 32 and junction 80 will be effective to cause the emitter electrode of transistor 38 to become positive with respect to the base electrode. This will, of course, cause the transistor 38 to become conductive between emitter and collector electrodes so that field current will now be able to flow from battery 36 through junction 34, through lead wire 44, through the emitter to collector circuit of transistor 38, through junction 46, through lead wire 48 and thence through the field winding 12 to ground. This voltage appearing across lead wire 32 and junction 80 will also be effective to charge the capacitor 76 since the condenser is connected directly across lead wires 44 and 74.

When the phase relationship of the output voltage of the phase windings of stator 14 is such that the rectifier 22 is conductive, there will be no voltage developed across the rectifier to maintain the transistor 38 in a state of conduction. This transistor, nevertheless, is maintained in a state of conduction at this time since the capacitor 76 now discharges through the emitter to base circuit of transistor 38 and through the resistor 72. The rectifier 78 prevents the condenser from discharging through the generator 10 but does not prevent the condenser from discharging through the emitter to base circuit of transistor 38 and will not prevent the condenser from discharging through the emitter to collector circuit of transistor 52 when it is conductive. It can be seen from the foregoing that as the generator starts to build up voltage, the transistor 38 is rendered immediately conductive by the voltage appearing across rectifier 22 during certain parts of the A.C. voltage cycle and by the discharge of condenser 76 in other parts of the A.C. voltage cycle of the applied voltage.

With the transistor 38 fully conductive during the building up of voltage by the generator 10, it is apparent that full field current will be applied to the field winding 12. At some point in the build-up of the generator, the voltage being picked off between lead wire 44 and the tap point 66 on resistor 68 will be of such a value as to cause the Zener diode 58 to break down and conduct. It is pointed out that the resistor 68 is connected between the lead wire 44 and ground, and therefore has a voltage developed across it which is equal to the output voltage of the bridge rectifier network. When the Zener diode 58 breaks down, the transistor 52 will begin to conduct between the emitter and base electrodes. With current flow between the emitter and base electrodes of transistor 52, there will be a consequent current flow between the emitter and collector electrodes of transistor 52. This will cause the junction point 53 to have substantially the same potential as the emitter electrode of transistor 38 and will therefore cut off the emitter to base current in transistor 38. With the emitter to base current of transistor 38 being cut off, the transistor 38 will be substantially fully non-conductive between emitter and collector to therefore abruptly cut off field current.

As the voltage appearing between lead wires 30 and 32 drops below a predetermined desired value, the transistor 52 will be rendered non-conductible between the emitter and base electrodes to cut off its emitter to collector current. This will permit the transistor 38 to once more have emitter to base current to therefore cause the transistor 38 to become fully conductive between emitter and collector and therefore provide for full field current.

It is pointed out that the transistor 38 is driven either fully non-conductive or fully conductive. This is desirable since it greatly reduces the internal heating of the transistor 38 as compared with a situation where the transistor, for example, is operated at its half-conducting point. When the transistor is conducting full field current, there is little voltage drop thereacross so there is little or no power developed to cause heating. On the other hand, when the transistor 38 is substantially non-conductive, there is a high voltage developed thereacross but little or no current so that the power once more that causes heating is negligible.

The capacitor 62 provides a feedback connection between the lead wire 40 and the junction 60 to speed the switching action. In other words, when the transistor 38 is being driven towards one of its operating states, a voltage is fed back to condenser 62 to enhance the switching action. This feedback voltage thus serves to speed the switching from a non-conducting to a conducting state and vice versa. The capacitor 70 is used to smooth out the voltage being applied to the voltage divider resistor 68. The resistor 55 improves the switching of transistor 52 under high ambient temperature by biasing the transistor 52 slightly off. The rectifier 59 protects the transistor 38 by dissipating the inductive energy of the field winding 12.

It can be seen from the foregoing that a transistor regulating system has been provided which has a minimum number of parts and which is operative to cause the transistor that controls the field current to be switched between fully conductive and fully non-conductive positions. In addition, the regulator of this system is operative to prevent a discharging of the battery 36 through both the stator winding 14 and the field winding 12 without the use of extra relay operated switches or other elements than those built into the regulator.

While the embodiment of the present invention as herein disclosed constitutes a preferred form, it is to be understood that other forms might be adopted.

What is claimed is as follows:

1. In combination, an A.C. generator having an output winding and a field winding, a bridge rectifier network connected with said output winding, a three-terminal semi-conductor having a pair of current carrying terminals and a control terminal, a storage battery, means connecting said storage battery across the output terminals of said bridge rectifier network, means connecting the current carrying terminals of said semi-conductor in series with said field winding and to one output terminal of said bridge rectifier network, means connecting one of the current carrying terminals and the control terminal of said semi-conductor across one of the rectifiers of said bridge rectifier network, and means for applying a control voltage to the control electrode of said semi-conductor in accordance with the voltage appearing across the output terminals of said bridge rectifier network, said bridge rectifier network forming thesole means for preventing discharging of said battery through the output winding of said generator.

2. In combination, an alternating current generator having an output winding and a field winding, a bridge rectifier network having output terminals connected with said output winding, a transistor having emitter, base and collector electrodes, means connecting the emitter to collector circuit of said transistor between one of the output terminals of said bridge rectifier network and said field winding whereby the field current through said field winding is controlled as a function of the conductance of said transistor between emitter and collector electrodes, a battery, means connecting said battery across the output terminals of said bridge rectifier network, means connecting the emitter to base circuit of said transistor across one of the rectifiers of said bridge rectifier network, and means for applying a control voltage to the base electrode of said transistor in accordance with the voltage appearing across the output terminals of said bridge rectifier network.

3. In combination, an alternating current generator having an output winding and a field winding, a bridge rectifier network having output terminals and having input terminals connected with said output winding, a battery connected across the said output terminals of said bridge rectifier network to be charged thereby, a transistor having emitter, base and collector electrodes, means connecting the emitter to collector circuit of said transistor between one of the output terminals of said bridge rectifier network and said field winding, means connecting the emitter to base circuit of said transistor across one of the rectifiers of said bridge rectifier network, and a capacitor connected across said one rectifier.

4. In combination, an alternating current generator having a field winding and an output winding, a bridge rectifier network having input terminals connected with said output winding and having output terminals, a battery, means connecting said battery directly across the output terminals of said bridge rectifier network, a transistor having emitter, base and collector electrodes, means connecting the emitter to collector circuit of said transistor between one of the output terminals of said bridge rectifier network and said field winding, means connecting the emitter to base circuit of said transistor across one of the rectifiers of said bridge rectifier network, a capacitor, a second rectifier, said condenser and second rectifier having a common junction, means connecting one side of said capacitor with one of the output terminals of said bridge rectifier network, means connecting one side of said rectifier with one side of said second rectifier, and means for applying a variable control voltage to the base electrode of said transistor.

5. In combination, an alternating current generator having a field winding and an output winding, a bridge rectifier network having input terminals connected with said output winding and having output terminals, a transistor having emitter, base and collector electrodes, means connecting the emitter to collector circuit of said transistor between one of the output terminals of said bridge rectifier network and said field winding, first and second conductor means connected with opposite sides of one of the rectifiers of said bridge rectifier network, means connecting the emitter to base circuit of said transistor across said first and second conductor means, a capacitor connected across said first and said second conductor means, a second rectifier connected between one of said first and said second conductor means and one side of said capacitor, and means for applying a control voltage to the base electrode of said transistor in accordance with the voltage appearing across the output terminals of said bridge rectifier network.

6. In combination, a generator having an output winding and a field winding, means connected with said output winding providing first and second voltages, a transistor having emitter, base and collector electrodes, means connecting the emitter to collector circuit of said transistor and said field winding with a first of said voltages where said field winding is energized from a first of said voltages through the emitter to collector circuit of said transistor, means connecting the emitter to base circuit of said transistor with the second of said voltages, and voltage sensing means connected with the base electrode of said transistor energized from said first voltage.

7. In combination, an alternating current generator having an output winding and a field winding, rectifier means connected with said output winding providing first and second sources of direct current, a transistor having emitter, base and collector electrodes, means connecting the emitter to collector circuit of said transistor and said field winding with said first source of direct current, means connecting the emitter to base circuit of said transistor with said second source of direct current, a sensing circuit connected with the base electrode of said transistor, and means connecting said sensing circuit with said first source of direct current.

8. In combination, an alternating current generator having a field winding and an output winding, a bridge rectifier network having input terminals connected with said output winding and having output terminals, a first transistor having emitter, base and collector electrodes, means connecting the emitter to collector circuit of said transistor between one of the output terminals of said bridge rectifier network and said field winding, means connecting the emitter to base circuit of said first transistor across one of the rectifiers of said bridge rectifier network, a second transistor having emitter, base and collector electrodes, means connecting the collector electrode of said second transistor with the base electrode of said first transistor, a voltage dividing network connected across the output terminals of said bridge rectifier network, and means connecting the emitter to base circuit of said second transistor across at least a portion of said voltage dividing network.

9. In combination, an alternating current generator having a field winding and an output winding, a bridge rectifier network having input terminals connected with said output winding and having output terminals, a first transistor having emitter, base and collector electrodes, an energizing circuit for said field winding connected across the output terminals of said bridge rectifier network and including the emitter to collector circuit of said first transistor, a second transistor having emitter, base and collector electrodes, means connecting the base electrode of said first transistor with the collector electrode of said second transistor, means connecting the emitter to base circuit of said first transistor across one of the rectifiers of said bridge rectifier network, a voltage sensing circuit connected across the output terminals of said bridge rectifier network, and means connecting the emitter to base circuit of said second transistor with said voltage sensing circuit.

10. In combination, an alternating current generator having a field winding and an output winding, a bridge rectifier network having input terminals connected with said output winding and having output terminals, a first transistor having emitter, base and collector electrodes, means connecting the emitter to collector circuit of said first transistor between one of the output terminals of said bridge rectifier network and said field winding, means connecting the emitter to base circuit of said first transistor across one of the rectifiers of said bridge rectifier network, a second transistor having emitter, base and collector electrodes, means connecting the collector electrode of said second transistor with the base electrode of said first transistor, a voltage sensing circuit including a Zener diode, means connecting said voltage sensing circuit across the output terminals of said bridge rectifier network, and means connecting the emitter to base circuit of said second transistor with said voltage sensing network.

11. In combination, an alternating current generator having an output winding and a field winding, a bridge rectifier network having input terminals connected with said output winding and having output terminals, a first transistor having emitter, base and collector electrodes, means connecting the emitter to collector circuit of said first transistor between one of the output terminals of said bridge rectifier network and said field winding, first and second conductor means connected across one of the rectifiers of said bridge rectifier network, a second rectifier connected in series with one of said conductor means, a capacitor having one side thereof connected with one of said conductor means and having an opposite side thereof connected with one side of said second rectifier, means connecting the emitter to base circuit of said first transistor across said condenser, a second transistor having emitter, base and collector electrodes, means connecting the collector electrode of said second transistor with the base electrode of said first transistor, a voltage sensing network connected across the output terminals of said bridge rectifier network, and means connecting the emitter to base circuit of said second transistor with said voltage sensing network.

12. A voltage regulator comprising, first, second, third and fourth terminals, said first and said second terminals being adapted to be connected with a first direct current voltage source and said first and third terminals being adapted to be connected with another direct current voltage source, a transistor having emitter, base and collector electrodes, means connecting the emitter to collector circuit of said transistor between said first and said fourth terminals, means connecting the emitter to base circuit of said transistor across said first and said second terminals, a voltage sensing network connected with the base electrode of said transistor, and means connecting said voltage sensing network across said first and said third terminals.

13. A voltage regulator for regulating the output voltage of a generator comprising, a field terminal, a positive terminal, a negative terminal and a fourth terminal, a third terminal semiconductor means having a pair of current carrying terminals and a control terminal, means connecting the current carrying terminals of said three terminal semiconductor means between said positive terminal and said field terminal, means connecting one of the current carrying terminals and the control terminal of said three terminal semiconductor means between said positive terminal and said fourth teminal, a voltage sensing circuit connected across said positive and negative terminals, and means connecting the control terminal of said three terminal semiconductor means with said voltage sensing circuit, said positive and negative terminals and said positive and fourth terminals forming two pairs of input terminals for said voltage regulator that are adapted to be connected with separate D.C. voltage sources.

14. The voltage regulator according to claim 13 wherein a capacitor is connected across said positive and fourth terminals.

15. The voltage regulator according to claim 13 wherein a diode is connected in series with said fourth terminal and wherein a capacitor is connected between said positive terminal and a junction of one side of said diode and the control terminal of said three terminal semiconductor means.

References Cited in the file of this patent
UNITED STATES PATENTS

| | | |
|---|---|---|
| 2,862,175 | Guyton et al. | Nov. 25, 1958 |
| 2,877,402 | Hallidy | Mar. 10, 1959 |
| 2,890,404 | Cronin | June 9, 1959 |
| 2,897,430 | Winkel | July 28, 1959 |
| 2,903,639 | Meszaros | Sept. 8, 1959 |
| 2,945,174 | Hetzler | July 12, 1960 |